United States Patent [19]

Ito et al.

[11] Patent Number: 4,953,037
[45] Date of Patent: Aug. 28, 1990

[54] ORIGINAL READING APPARATUS

[75] Inventors: Yoshio Ito; Makoto Takemura, both of Tokyo; Junichi Sata; Shinnichirou Otsuki, both of Yokohama, all of Japan

[73] Assignee: Canon Kabushiki Kaisha, Tokyo, Japan

[21] Appl. No.: 453,113

[22] Filed: Dec. 22, 1989

Related U.S. Application Data

[63] Continuation of Ser. No. 305,114, Feb. 2, 1989, abandoned.

[30] Foreign Application Priority Data

Feb. 5, 1988 [JP] Japan .................... 63-024952
Mar. 30, 1988 [JP] Japan .................... 63-077534
Apr. 6, 1988 [JP] Japan .................... 63-084257

[51] Int. Cl.⁵ .............................................. H04N 1/12
[52] U.S. Cl. .................................. 358/496; 358/488; 358/498
[58] Field of Search .................... 358/496, 488, 498

[56] References Cited

U.S. PATENT DOCUMENTS

3,510,125  5/1970  Krueger et al. .
4,300,169 11/1981  Sato .................................... 358/488
4,451,854  5/1984  Daigo .................................. 358/488
4,475,128 10/1984  Koumura ............................ 358/496
4,768,100  8/1988  Kunishima ......................... 358/498
4,811,049  3/1989  Honjo et al. .
4,839,740  6/1989  Yoshida .............................. 358/498

Primary Examiner—Howard W. Britton
Attorney, Agent, or Firm—Fitzpatrick, Cella, Harper & Scinto

[57] ABSTRACT

Reading apparatus has first transport device for transporting an original document, second transport device for transporting the original document, transported by said first transport device, to original reading device, original detecting device positioned between said first and second transport devices, and drive structure for starting the rotation of said second transport device after a predetermined period from the detection of the original document by said original detecting device.

15 Claims, 8 Drawing Sheets

ORIGINAL READING APPARATUS

This is a continuation of application Ser. No. 305,114, filed Feb. 2, 1989 now abandoned.

BACKGROUND OF THE INVENTION

1. Field of the Invention

The present invention relates to an original reading apparatus adapted for use in an image forming apparatus such as a facsimile apparatus or the like, and more particularly to an original reading apparatus for reading the image of an original document during transportation thereof. Such image reading apparatus is being utilized in an original image scanning mechanism for use in a facsimile apparatus, a laser beam printer or the like.

2. Related Background Art

Conventionally there are known original reading apparatus, for use in a facsimile apparatus or the like, for reading the image of an original document during the transportation thereof. In such conventional apparatus, however, it has been difficult to properly align the original document, fed from an original tray, to read the image correctly in an original reading position. Also there has been required a complex structure for prolonging the service life of the feeding means at the original reading position.

Such drawbacks have been particularly marked in an image reading apparatus in which a sheet-shaped original document is separated and transported by a separating device, and is introduced between a contact-type image sensor and an original transporting member which are maintained in mutual contact under a predetermined pressure, whereby the image of said original document is read while it is maintained in sliding contact with an image reading face of said image sensor by the transporting force of said original transporting member rotated at a predetermined peripheral speed.

SUMMARY OF THE INVENTION

In consideration of the foregoing, it is an object of the present invention to provide an original reading apparatus of a simple structure enabling easy alignment of the original document and capable of prolonging the service life of feeding means.

It is another object of the present invention to provide an original reading apparatus allowing easy control of the feeding means and capable of improving the reliability of transportation of the original documents.

According to the present invention, in order to achieve the above-mentioned objects, a roller is rotated for a predetermined duration after the detection of an original document by a sensor, thereby leading the front end of the original document to the nip between the roller and the reading sensor, so that the front end of the original can be exactly registered.

Also the service life of the roller can be extended by driving said roller after the original document is pinched between the roller and the reading sensor, since the abrasion by the friction with said sensor can be reduced.

Also according to another aspect of the present invention, the power from driving means is transmitted to or disconnected from at least first transporting means by means of power switch means, so that it is rendered possible to reduce the number of driving means and to reduce the cost, by activating first and second transport means by single driving means. Furthermore the reliability can be improved by simplifying the control of the driving means.

It is furthermore possible to select the driving of the separating device alone or the driving of the original transporting member together with said separating device according to the direction of rotation of a drive source, thereby preventing the abrasion of surfacial rubber of the original transporting member and image reading face of the contact-type image sensor, resulting from the sliding contact thereof, and reducing the load of the drive source due to the absence of a high torque resulting from the high friction between the two. Particularly the latter leads to cost reduction in the drive source, saving of electric power consumption and reduction of heat generation.

It is also possible to correct the skewed feeding of the original document, by causing the front end of the original document to collide with the nip between the original transporting member and the contact-type linear image sensor and correcting the direction of the original document according to said collision of the original document with the nip.

It is furthermore possible to provide drive switching means which so functions as to activate first and second transporting means in a direction to advance the original document at the rotation of single drive source in a direction, and to activate the second transporting means in a direction to advance the original document but to deactivate the first transporting means at the rotation of said single drive source in the other direction, and driving the drive source in the forward or reverse direction or stopping said drive source in response to signals indicating the detection of an end of the original document, thereby ensuring transfer of the original document between the first and second transporting means, enabling provision of a constant or arbitrary interval between the original documents, reduction of the abrasion of the first transporting means, and a high accuracy of image reading.

DESCRIPTION OF THE PREFERRED EMBODIMENTS

Now the present invention will be clarified in detail by embodiments thereof shown in the attached drawings.

Figure 1:
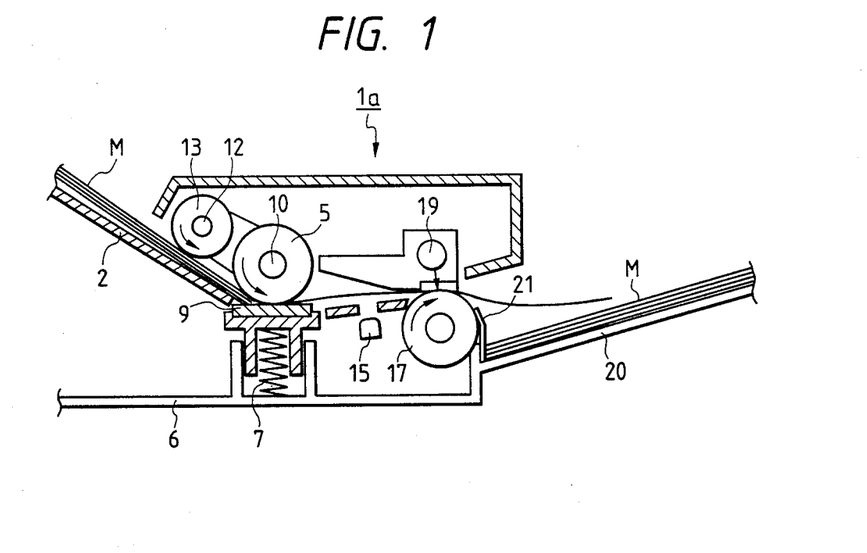
FIG. 1 is a lateral cross-sectional view of a first embodiment of the original reading apparatus of the present invention.
Figure 2:
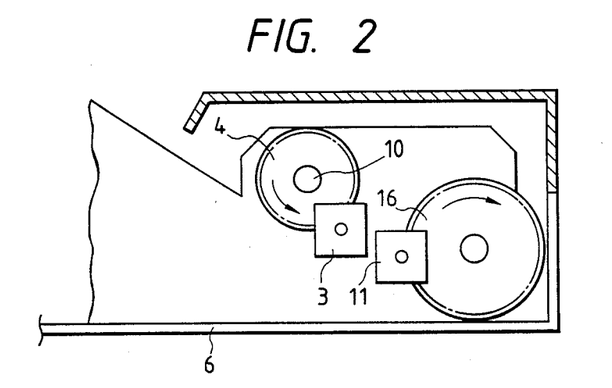
FIG. 2 is a lateral cross-sectional view of a drive unit of the original reading apparatus shown in FIG. 1.

Original reading apparatus in which the image of an original document is read during the transportation of said original document is already known. As shown in FIGS. 1 and 2, the original reading apparatus 1a of the present invention is provided with an original tray 2 for stacking plural original documents M thereon. At the downstream side of said tray 2, a transport roller 5 coupled with a motor 3 through a gear 4 is rotatably supported, and a separating pad 9 is biased against the lower side of the roller 5, by means of a spring 7 of which an end is supported by the main body 6. The shaft 10 of said transport roller 5 rotatably supports a support plate (not shown) which in turn supports a shaft 12. Said shaft 12 rotatably supports a pick-up roller 13, which is driven by said transport roller 5 through an unrepresented belt. At the downstream side of said separating pad 9, there is provided a sheet end sensor 15 for detecting an end of the original document M, and a platen roller 17 coupled with a motor 11 through a gear 16 is positioned at the downstream side of said sensor 15. Facing said roller 17 there is provided a contact sensor 19 for reading the image of the original document M, and a sheet discharge tray 20 is provided at the downstream side of said sensor 19. At the base portion of said tray 20 there is provided a separating plate 21 for separating the original document M from said platen roller 17.

When the original documents M are stacked on the original tray 2 and an unrepresented start key is actuated, the motor 3 starts to rotate, and the rotation is transmitted through the gear 4 to the transport roller 5, and then to the pick-up roller 13 through the unrepresented belt. The original document M on the original tray 2 is fed by the pick-up roller 13 to the transport roller 5, and the uppermost original document M alone is separated by said roller 5 and the separating pad 9 and advanced to the downstream side. Upon detection of the front end of the original document M by the sheet end sensor 15, the motor 3 is stopped after a predetermined time long enough for the original document M to reach the platen roller 17. Then, after a predetermined time, the motor 11 starts to rotate, and the rotation is transmitted to said platen roller 17 through the gear 16. Thereafter the original document M is transported by pinching force between the platen roller 17 and the direct reading sensor 19, and the image is read by said sensor 19 during said transportation. Upon detection of the rear end of said original document by the sheet end sensor 15, the motor 11 stops after a predetermined time long enough for the original document M to be discharged to the tray 20. Thus the original document M is discharged by the platen roller 17 onto the sheet discharge tray 20. The above-explained operations are repeated to read the original documents on the original tray 2 in succession, with a secure interval therebetween, and to discharge said original documents M onto the tray 20.

The above-explained structure ensures exact registration of the front end of the original document, since the roller 5 is rotated for a predetermined period, after the detection of the original document by the sensor 15, to lead the front end of the original document to the nip between the roller 17 and the reading sensor 19.

Also the service life of the roller 17 is extended as it starts rotation after the original document is pinched between said roller 17 and the reading sensor 19, so that abrasion by friction with the sensor 19 is reduced.

In the following there will be explained another embodiment in which the rollers 5 and 17 are controlled by the same motor. Components similar to those in the foregoing embodiment will be represented by the same numbers or symbols and will not be omitted from the following explanation.

Figure 3:
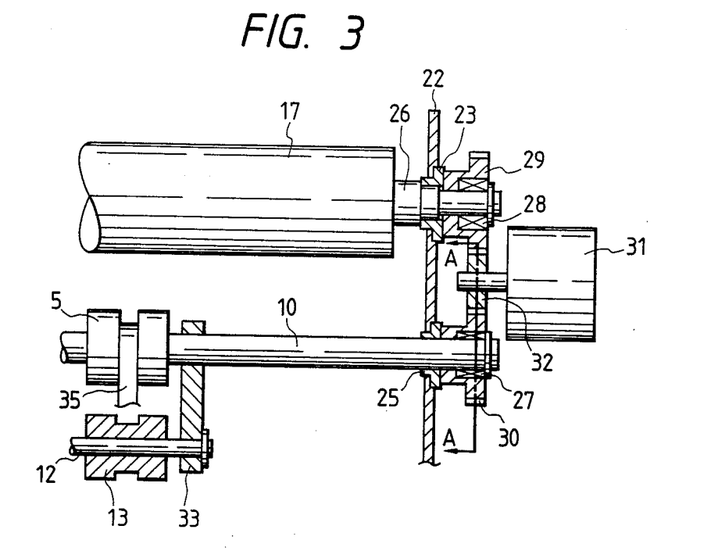
FIG. 3 is a planar cross-sectional view of a second embodiment of the image reading apparatus of the present invention.
Figure 4:
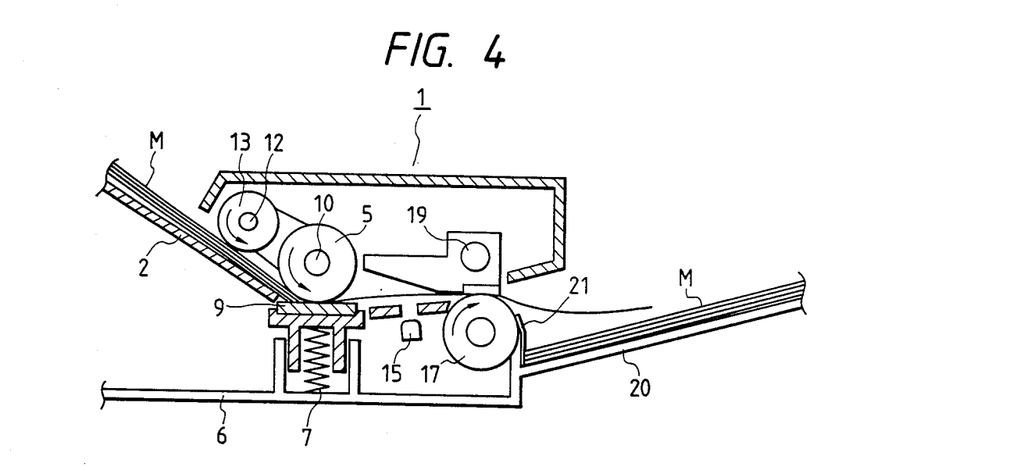
FIG. 4 is a lateral cross-sectional view thereof.
Figure 5:
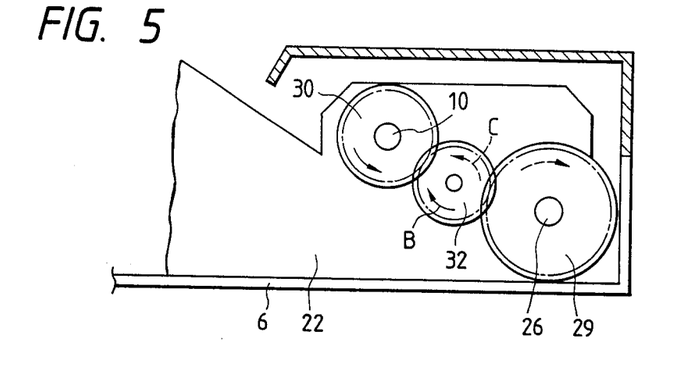
FIG. 5 is a lateral cross-sectional view of the drive unit thereof.

As shown in FIGS. 3 to 5, the original reading apparatus 1 is provided with frames 22, 22 respectively at the front rear sides of the main body 6, and each frame 22 is equipped with bearings 23, 25. The bearings 23 rotatably support a shaft 26 of the platen roller 17 constituting second transport means, and a gear 29 incorporating a one-directional clutch 28 is fitted on an end of said shaft 26. The bearings 25 rotatably support a shaft 10, and a gear 30 incorporating a one-directional clutch 27 is fitted on an end of said shaft 10. In the vicinity of said gears 29, 30 there is provided a motor 31, the output shaft of which supports a gear 32 meshing with said gears 29, 30. In FIG. 3 there are also shown a swinging arm 33 supported by the shaft 10 and supporting a shaft 12, and a belt 35 for transmitting rotation from the transport roller 5 to the pick-up roller 13.

Figure 6:
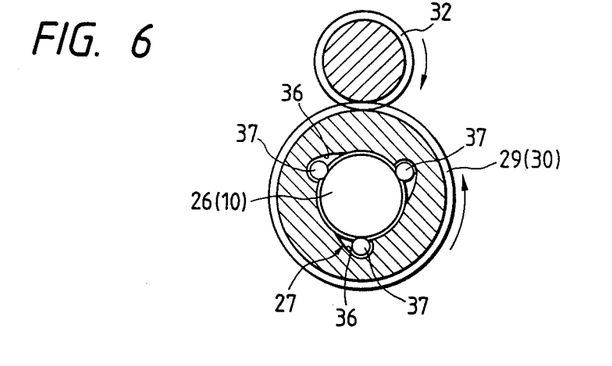
FIG. 6 is a lateral cross-sectional view of a one-directional clutch.

As shown in FIG. 6, said one-directional clutch 27 has a ratchet structure in which tapered grooves 36 formed at the internal side of the gear 29 or 30 and incorporating steel balls 37 are fitted with the shaft 26 or 10.

In the present embodiment of the above-explained structure, when plural original documents M are placed on the original tray 2 and an unrepresented start button is actuated, the motor 31 is activated in a direction to rotate the gear 32 in a direction of arrow B (see FIG. 5). The rotation of said gear 32 is transmitted, through the gear 30 and the one-directional clutch 27, to the shaft 10, whereby the transport roller 5 is rotated in a direction of arrow indicated in FIG. 4. The rotation of the gear 32 is also transmitted to the gear 29, but not to the shaft 26 due to the presence of the one-directional clutch 28. The rotation of the roller 5 is transmitted through the belt 35 to the pickup roller 13, which thus feeds the original document M from the original tray 2 to the transport roller 5. Said original document M is separated by said transport roller 5 and the separating pad 9, and the uppermost one alone is advanced. Upon detection of the front end thereof by the sheet end sensor 15, the motor 31 is stopped after a predetermined time long enough for the front end of said original document M to come into contact with the nip between the platen roller 17 and the reading sensor 19, thus forming a loop in the original document.

Thereafter the motor 31 is reversed to rotate the gear 32 in a direction C (see FIG. 5), and the rotation of said motor 31 is transmitted, through the gears 32, 29 and the one-directional clutch 28, to the shaft 26. Thus the platen roller 17 is rotated to advance the original document M, maintained in contact with the nip between the platen roller 17 and the reading sensor 19 and forming a loop, toward the sheet discharge tray 20.

The rotation of the gear 32 is transmitted clockwise to the gear 30 (see FIG. 5), but not to the shaft 10 due to the presence of the one-directional clutch 27, so that the transport roller 5 is rotated by the movement of the original document 12. After the image reading of the original document M with the reading sensor 19, upon detection of the rear end of said original document by the sheet end sensor 15, the motor 31 is stopped after a predetermined period long enough for the original document M to be discharged to the sheet discharge tray 20. In this manner said original document M is discharged onto the tray 20. The above-explained operations are repeated to read the original documents M on the tray 2 in succession and discharge said original documents onto the tray 20.

Figure 7:
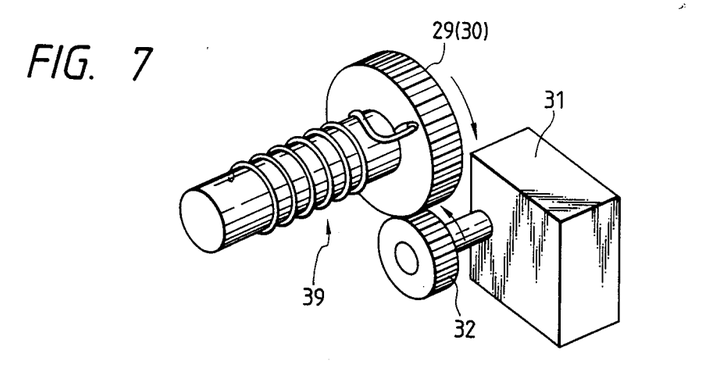
FIG. 7 is a perspective view of another embodiment of the one-direction clutch.

In the foregoing embodiment, the one-directional clutches 17, 28 are of a ratchet structure, but there may also be employed spring clutches as shown in FIG. 7.

Figure 8:
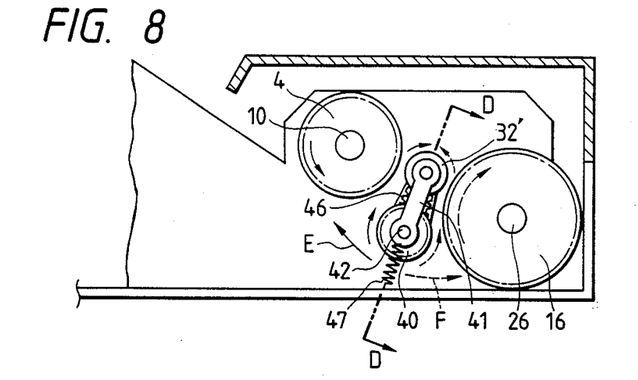
FIG. 8 is a lateral cross-sectional view of another embodiment of the drive unit.
Figure 9:
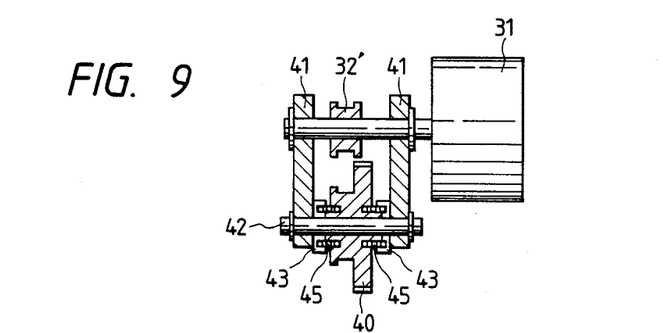
FIG. 9 is a schematic cross-sectional view of said another embodiment of the drive unit.

Also the one-directional clutches employed as the drive switching means in the foregoing embodiment may be replaced, as shown in FIGS. 8 and 9, by a swinging driven gear 40 which meshes with the gear 4 for driving the transport roller 5 or the gear 16 driving the platen roller 17 according to the direction of rotation of the motor 31. A shaft 42 rotatably supporting said driven gear 40 is rotatably supported by a swinging arm 41 which is in turn rotatably supported by the output shaft of the motor 31, and said driven gear 40 is driven by a pulley 32' fixed on the output shaft of the motor 31, through a timing belt 46. A pad 43 integrally rotating with said driven gear 40 is pressed against the swinging arm 41 by a spring 45, and said swinging arm 41 is biased in rotation by the friction with said pad 43. In FIG. 8 there is also shown a spring 47 for returning the driven gear to a homeposition when the motor 31 is stopped.

When the motor 31 rotates the pulley 32' clockwise or counter-clockwise, the driven gear 40 respectively swings in a direction E (FIG. 8) to mesh with the gear 4, or in a direction F (FIG. 8) to mesh with the gear 16.

Figure 10:
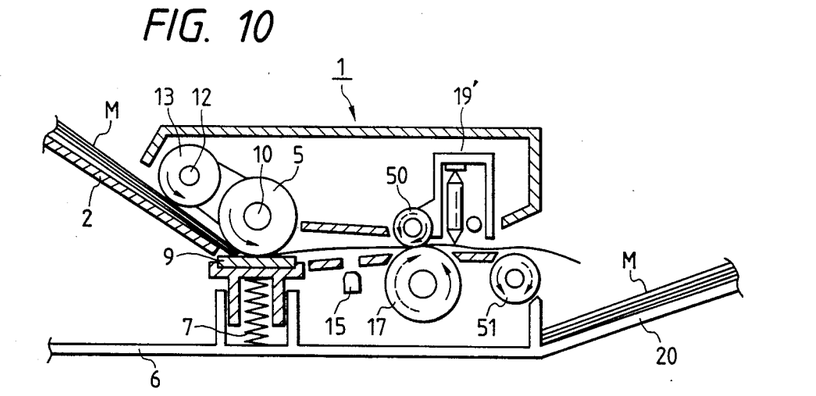
FIG. 10 is a lateral cross-sectional view of a third embodiment of the original reading apparatus of the present invention.

Also the direct-reading sensor 19 employed as the original reading means in the foregoing embodiment may be replaced by an focusing-type sensor 19' as shown in FIG. 10.

Figure 11:
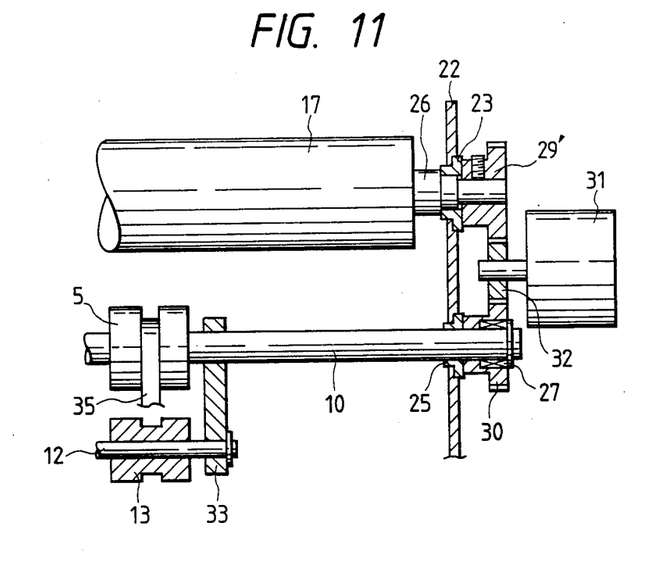
FIG. 11 is a planar cross-sectional view thereof.
Figure 12:
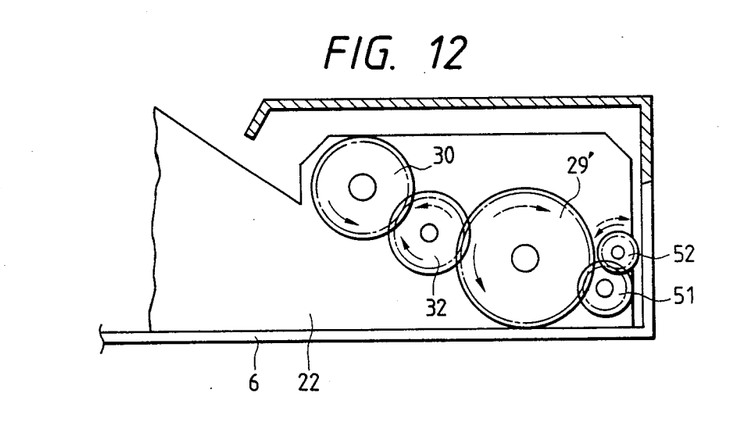
FIG. 12 is a lateral cross-sectional view of a drive unit thereof.

Furthermore the platen roller 17 employed as the second transport means in the foregoing embodiment may be replaced by second transport means, as shown in FIGS. 10 to 12, composed of a platen roller 17, a pressure roller 50 pressing the original document M to said roller 17, and a discharge roller 51 for discharging said original document M. By fixing the gear 29 to the shaft 26, the platen roller 17 and the pressure roller 50 rotate in the direction of solid-lined arrows when the original document M is transported by the transport roller 5. As a result, the front end of the original document M is given vibration even when said front end does not fall on the nip between the rollers 17 and 50 but on the periphery of either of said rollers, and can thus be led into said nip. The sheet discharge roller 51 is driven by the motor 31 through gears 32, 29', 51 and 52.

In the foregoing embodiments shown in FIGS. 1 and 4, the platen roller 17 is deactivated while the transport roller 5 is in motion, but it is also possible, as shown in FIGS. 13 to 16, to always rotate the platen roller 17 clockwise during the rotation of the motor 31. The platen roller 17 receives the power of the motor 31, either through a first power transmitting channel consisting of gears 32, 29a and a second power transmitting channel consisting of gears 32, 53, 29b. The power is transmitted through said second or first power transmitting channel respectively when the motor 31 rotates clockwise or counter-clockwise.

Figure 14:
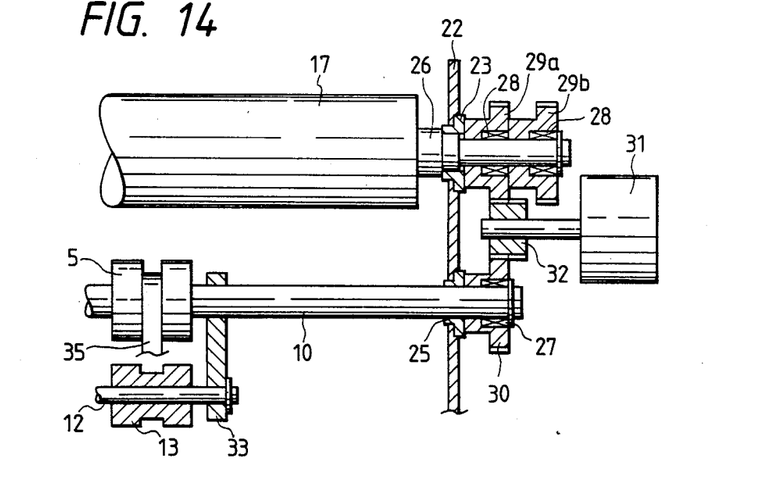
FIGS. 14 and 15 are planar cross-sectional views thereof, respectively along lines C—C and D—D in FIG. 16.
Figure 15:
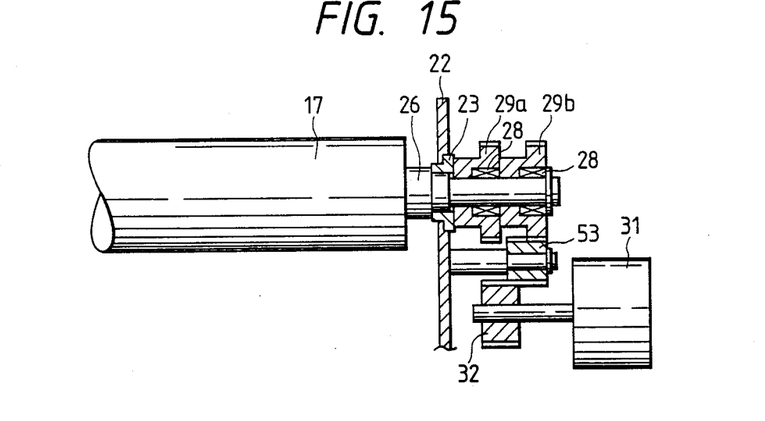
Figure 16:
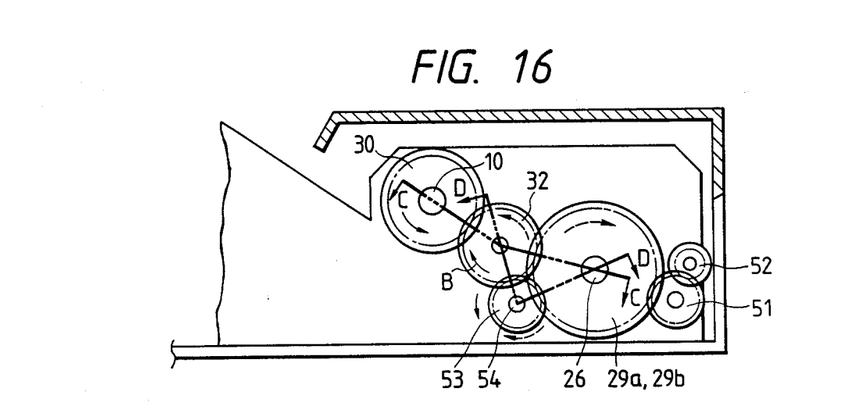
FIG. 16 is a lateral cross-sectional view of the drive unit thereof.

FIG. 14 is a cross-sectional view along a line C—C in FIG. 16, connecting the centers of the gears 30, 32, 29a and 29b therein. Gears 29a, 29b of a same form incorporate one-directional clutches 28. The gear 29a meshes directly with the gear 32 fixed on the shaft of the motor 31. FIG. 15 is a cross-sectional view along a line D—D in FIG. 16, connecting the centers of the gears 32, 53, 29a and 29b. The gear 29b meshes with the gear 32 of the motor 31, through an idler gear 53 rotatably supported on a boss of the frame. The one-directional clutch incorporated in the gear 29a or 29b is so constructed as to transmit the rotation to a shaft 26 when rotated in a direction indicated by broken-lined arrow in FIG. 16, but not to transmit said rotation in case of the rotation in the opposite direction.

In the following there will be explained the function of the original reading apparatus employing the above-explained driving mechanism.

In the present embodiment of the above-explained structure, when plural original documents are stacked on the original tray 2 and an unrepresented start key is actuated, the motor 31 is activated in a direction to rotate the gear 32 in a direction B.

The clockwise rotation of the gear 32 (solid-lined arrow B in FIG. 16) powers the first transport means, consisting of a first rotary shaft 10 and a first transport roller 5, in a direction to advance the original document. On one hand, the gear 29b meshing with the gear 32 rotates in a direction opposite to the broken-lined arrow in FIG. 16 and slips on a second rotary shaft 26 due to the function of the one-directional clutch 28. The gear 29b coupled with the gear 32 through the idler gear 53 is rotated in a direction of broken-lined arrow in FIG. 16, and drives the second rotary shaft 26 and the second transport roller 17 in a direction of broken-lined arrow in FIG. 13, by the function of the one-directional clutch 28.

Figure 13:
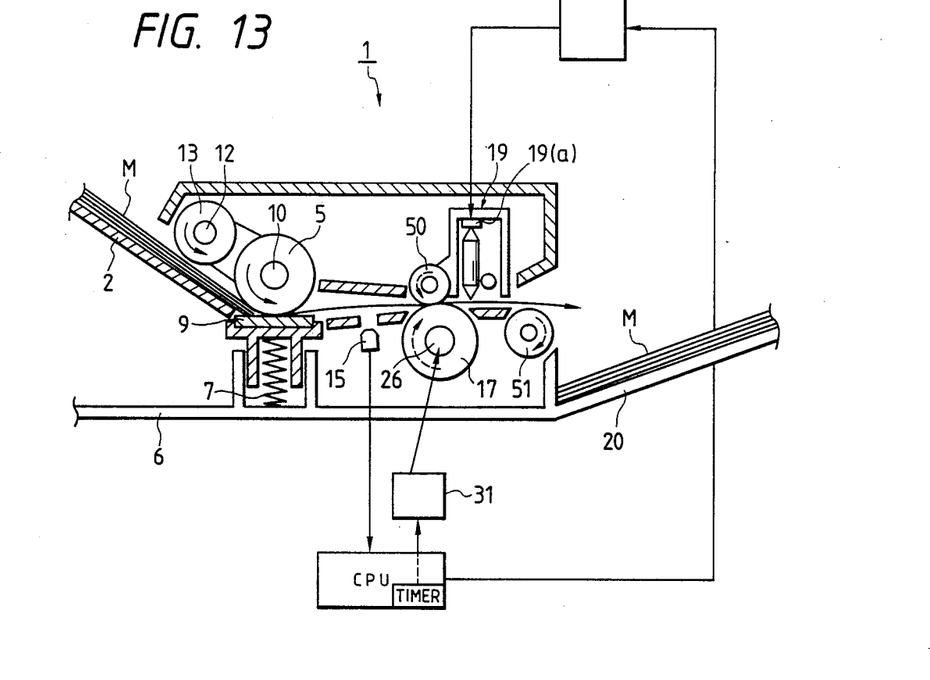
FIG. 13 is a lateral cross-sectional view of a fourth embodiment of the image reading apparatus of the present invention.

The front end of the original document separated and transported by the first transport roller 5 is detected by the sensor 15, and simultaneously reaches second transport means, consisting of a second transport roller 17 rotated in a direction of broken lined arrow in FIG. 13 and an idler roller 50. Then, in response to a detection signal from the sensor 15, the motor 31 is activated until a predetermined position for starting the image reading on the original document reaches a position directly below a sensor 19a of the focusing-type image sensor 19, and the motor 31 is then stopped.

Then the motor 31 is reversed to rotate the gear 32 in a direction of broken-lined arrow in FIG. 16. The gear 30 slips on the first rotary shaft 10, due to the incorporated one-directional, clutch 27, so that the first transport roller 5 is not driven. On the other hand, the gear 29a is driven in a direction of broken-lined arrow in FIG. 16 by the gear 32, and drives the second rotary shaft 26 and the second transport roller 17 in a direction of the broken-line arrow in FIG. 13, due to the function of the one-directional clutch 28. Also the gear 29b is driven by the idler gear 53 in a direction opposite to the broken-lined arrow in FIG. 16, and slips on the second rotary shaft 26, due to the function of the one-directional clutch.

During these functions, the original document transported by the second transport roller 17 is subjected to image reading and causes idling rotation of the first transport roller 5. In this manner the original document is securely transferred from the first transport means to the second transport means. Then, in response to the detection of the rear end of the original document by the sensor 15, the motor 31 is rotated by a predetermined amount, then stopped and reversed.

Thus the first transport roller 5 is again activated to separate and advance the next original document, but the preceding document and the succeeding document are separated by an interval at least equal to the distance between the first transport roller 5 and the sensor 15. In the meantime, the second transport roller 17 continues to advance the preceding original document.

The aforementioned predetermined amount of advancement of said motor 31 can be arbitrarily selected from a minimum value of zero (from immediately after the detection of the rear end of the original document by the sensor 15). Thus the interval between the original documents can be arbitrarily selected. The time can be controlled for example with a timer, through a control circuit (CPU).

The gear 32 may be coupled with the gear 29a, through an even number of gears, including zero. The structure shown in FIG. 14 corresponds to a case of zero gear. Also the gear 32 may be coupled with the gear 29b, through an odd number of gears. The structure shown in FIG. 15 corresponds to a case of one gear.

The one directional clutches 27, 28 employed as the drive switching means are not limited to the structure shown in FIG. 16 but are subjected to various modifications.

Also there may be employed a direct-reading sensor as the image reading means, at the position of the roller 50 in place therefor.

The above-explained embodiment provides following advantages;

(i) The transfer of the original document between the first and second transport means is securely conducted by the switching of forward and reverse rotation of a single drive source, and a predetermined interval can be given between the original documents:

(ii) Said interval can be arbitrarily selected, and can be shortened:

(iii) The abrasion of the first transport means is reduced.

As explained detailedly in the foregoing, there can be obtained a sheet original reading apparatus with a high image reading accuracy, by providing drive switching means which so functions as to activate first and second transport means in a direction to transport the original document at the rotation of a single drive source in a direction, and to activate the second transport means in a direction to transport the original document but deactivate the first transport means at the rotation of said single drive source in the other direction, and utilizing signals indicating the detection of an end of the original document for controlling the forward or reverse rotation or stopping of the drive source, thereby ensuring the transfer of the original document between the first and second transport means by means of a single drive source, enabling formation of a constant or arbitrary interval between the original documents, and reducing the abrasion of the first transport means.

Also in other embodiments of the present invention shown in FIGS. 3 to 16, the power of drive means is transmitted to or interrupted from at least the first transport means by means of power switching means. It is therefore possible to drive the first and second transport means with single drive means, thereby reducing the number of the drive means and lowering the cost. Also the control of the drive means can be simplified, thus improving the reliability.

On the other hand, in the original reading apparatus 1a shown in FIGS. 1 and 2, there are required two motors 3, 11 for ensuring the transfer of the original document M from the transport roller 5 to the platen roller 17, and for forming an interval between the original documents M, by independent driving of the transport roller 5 and the platen roller 17. Moreover these motors 3, 11 require complex control. Thus, the apparatus shown in FIGS. 3 to 16 are more advantageous in terms of reliability of the original document transportation.

Figure 17:
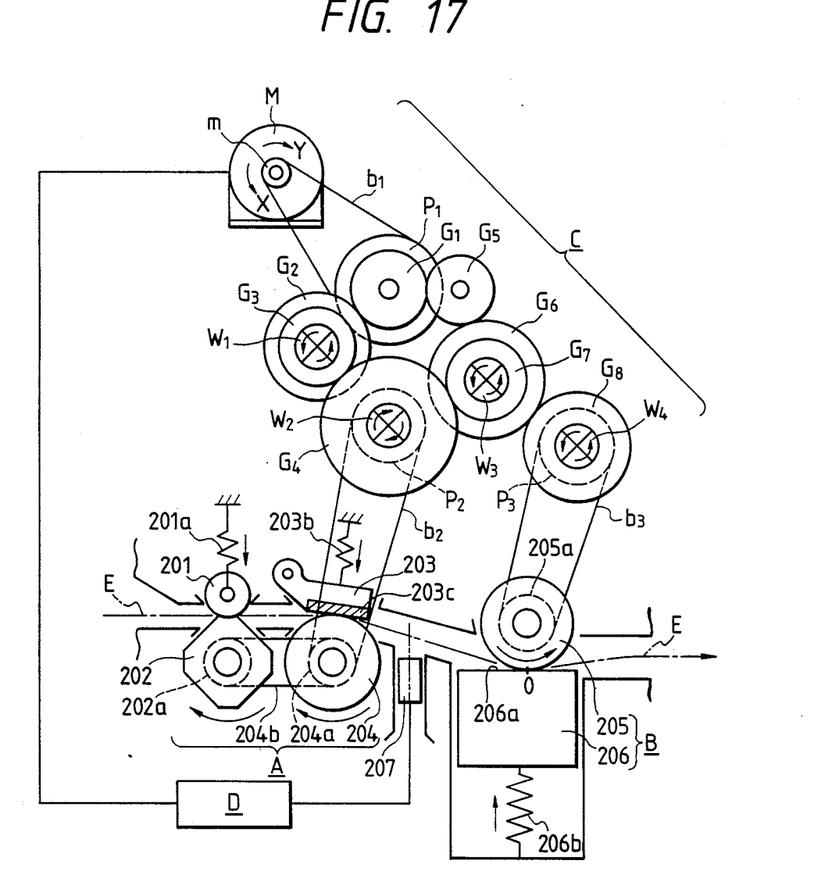
FIG. 17 is a lateral cross-sectional view of a fifth embodiment of the original reading apparatus of the present invention.

In the following there will be explained still another embodiment with reference to FIG. 17, illustrating a gear train preferable for controlling the rotation of two rollers with a single drive source.

There is also illustrated a sheet path E for the original document, moving from upper left to lower right in the illustration.

There are provided an original separating unit A positioned at the upstream side of said sheet path; an original image reading unit B positioned at the downstream side of said original separating unit; a drive source C; and a control circuit D.

The original separating unit A consists of a pressure roller 201 and a preliminary transport roller 202 positioned across said sheet path E, and a separating rubber plate 203 and a separating roller likewise positioned across the sheet path E at the downstream side of the first-mentioned rollers. The pressure roller is constantly biased toward the preliminary transport roller 202 by a compression spring 201a. The separating rubber plate 203 is rotatable about a shaft 203a, and is constantly biased toward the separating roller 203 by means of a compression spring 203b, so that the lower rubber face 203b is maintained in contact with the upper part of the separating roller 224. There are further provided a pulley 202a integral and concentric with the preliminary transport roller 202; a pulley 204a integral and concentric with the separating roller 204; and a belt 204b supported by said pulleys 202a, 204a: so that the separating roller 204 and the preliminary transport roller 202 are mutually linked in rotation.

The original image reading unit B consists of a rubber roller 205 serving as the original transporting member and a contact image sensor 206 (contact-type linear image sensor), positioned across the sheet path E. Said contact sensor 206 is constantly biased toward the rubber roller 205 by means of a compression spring 206b, whereby an upper image reading face 206a of the sensor 206 is maintained in pressure contact with the lower part of the original transport roller 205.

The drive source C is composed of a forward-reverse rotatable motor M serving as the power source; a first pulley P1 receiving the rotation of the output shaft m of said motor through a belt b1; a first gear G1 integral and concentric with said first pulley; a second gear G2 meshing with said first gear; a third gear G3 concentrically linked with said second gear through a first one-way clutch W1; a fourth gear G4 meshing with said third gear; a second pulley P2 concentrically linked with said fourth gear through a second one-way clutch W2; a belt b2 provided between said second pulley P2 and the separating roller 204 of the aforementioned separating unit A; a fifth gear G5 meshing with said first gear G1 in a position different from that of said second gear G2; a sixth gear G6 meshing with said fifth gear; a seventh gear G7 concentrically linked with said sixth gear through a third one-way clutch W3 and meshing with said fourth gear G4; an eighth gear G8 meshing with said sixth gear G6; a third pulley P3 concentrically linked with said eighth gear through a fourth one-way clutch W4; and a belt b3 provided between said pulley P2 and a pulley 205a concentric with the original transport rubber roller 205 of the aforementioned original image reading unit B.

Said first one-way clutch W1 is so constructed as to couple the second and third gears G2, G3 when the second gear G2 is rotated counter-clockwise in FIG. 17; said second one-way clutch W2 is so constructed as to couple the fourth gear G4 with the second pulley P2 when said fourth gear is rotated clockwise; said third one-way clutch W3 is to couple the sixth and seventh gears G6, G7 when said sixth gear G6 is rotated counter-clockwise; and said fourth one-way clutch is so constructed as to couple the eighth gear G8 with the third pulley P3 when said eighth gear G8 is rotated counter-clockwise.

The control circuit D receives detection information for example from a photosensor 7 positioned in the vicinity of the sheet path between said separating unit A and the original image reading unit B for detecting the front end or rear end of the original document, and controls the above-mentioned motor M etc.

The functions of the above-explained apparatus are as follows:

(i) In normal state, the motor M is not energized, so that the apparatus remain in the nonactive stand-by state.

(ii) When a stack of sheet-shaped original documents, or an original document, is inserted, with the image-bearing face downward, from an unrepresented entrance at the upstream end of the sheet path E (at the upper left portion of the drawing), said insertion is detected by an unrepresented original sensor such as a microswitch or a photosensor, and a corresponding detection signal is supplied to the control circuit D to start the forward rotation X of the motor M (output shaft m being rotated counter-clockwise). The original documents are sufficiently inserted from the entrance until the front ends thereof are pinched between the pressure roller 201 and the preliminary transport roller 202 of the separating unit A.

(iii) The forward rotation X of the motor M rotates the first pulley P1 and the first gear G1 counter-clockwise through the belt b1, thus rotating the second gear G2 and the fifth gear G5 clockwise. The rotation of the second gear G2 is not transmitted to the third gear G3, since it is in the non-coupling direction of the first one-way clutch W1. The rotation of the fifth gear G5 is transmitted, through the sixth gear G6, third one-way clutch W3, seventh gear G7, fourth gear G4, second one-way clutch W2, second pulley P2 and belt b2, to the pulley 204c concentric with the separating roller 204 of the separating unit A, whereby said separating roller 204 is rotated clockwise, as indicated by an arrow, with a predetermined peripheral speed. Also rotated clockwise is the preliminary transport roller 202, linked with said roller 204 through the pulley 204a, belt 204b and pulley 202a.

On the other hand, the eighth gear G8 meshing with the sixth gear G6 is rotated clockwise by the counter-clockwise rotation of said sixth gear G6, but the rotation of said eighth gear G8 is not transmitted to the third pulley P3 because it is in the non-coupling direction of the fourth one-way clutch W4. Consequently the original transport rubber roller 205 of the original image reading unit B is not driven.

In summary, the power transmitting system of the drive source C functions in a first mode, during the forward rotation X of the motor M, in which the power is transmitted only to the separating unit A but not to the original transport rubber roller 205 of the original image reading unit B.

(iv) Out of the original documents inserted from the entrance and pinched at the front ends thereof between the pressure roller 201 and the preliminary transport roller 202, the lowermost one in the stack, in direct contact with the preliminary transport roller 202 is given a pulling force and is transported to the nip of the separating rubber member 208 and the separating roller 204. Thus said lowermost original document is pinched, at the front end thereof, between the separating rubber plate 203 and the separating roller 204, and is subsequently transported toward the right along the sheet path, by the clockwise rotation of the separating roller 204. Along with the transportation of the lowermost original document by the rotation of the preliminary transport roller 202, the documents positioned above may be dragged by the lowermost one to cause so-called boule-feeding of the original documents, but such dragged original documents are stopped at the front ends thereof by the lower rubber face 203c of the separating rubber plate 203, and the lowermost original document alone is pinched smoothly at the front end thereof between the separating rubber plate 203 and the separating roller 204. In this manner the lowermost original document alone is separated and transported to the right along the sheet path E by the rotation of the separating roller 204.

(v) The original document separated by the separating unit A as explained above is detected, before the arrival of the front end thereof at the nip between the rubber roller 205 constituting the original transporting member of the original image reading unit B and the contact sensor 206, when the front end reaches the position of the original sensor 207, and a detection therefrom is sent to the control circuit D.

Upon receipt of said front end detection signal, the control circuit D calculates the time $t_1$ required by the front end of the original document, after passing the point of front end detection, to reach the nip 0 between the rubber roller 205 constituting the original transporting member of the original image reading unit B and the contact sensor 206, from the length of sheet path from the position of the original sensor 207 to said nip 0, and from the original transporting speed of the separating roller 204. Then, after the lapse of said period $t_1$ from the time of said detection of the front end of the original document, the motor M is switched from the forward rotation X to the reverse rotation Y.

(vi) The reverse rotation Y of the motor M drives the first pulley P1 and the first gear G1 clockwise, thus driving the second and fifth gears G2, G5 counter-clockwise.

The third gear G3 integrally rotates with the second gear G2 since the counter-clockwise rotation thereof is in the coupling direction of the first one-way clutch W1, and the rotation is further transmitted, through the fourth gear G4, second one-way clutch W2, second pulley P2 and belt b2, to the separating unit A, whereby the clockwise rotation of the separating roller 204 and the preliminary transport roller 202 is continued.

Also the counter-clockwise rotation of the fifth gear G5 is transmitted through the sixth gear G6 to drive the eighth gear G8 counter-clockwise. Since said rotation is in the coupling direction of the fourth one-way clutch W4, the third pulley P3 is driven counter-clockwise integrally with the eighth gear G8. This rotation is transmitted through the belt b3 and the pulley 204c to the original transporting rubber roller 205 to drive said roller counter-clockwise in the transporting direction of the original document.

Thus the power transmitting system of the drive source C functions in a second mode, during the reverse rotation Y of the motor M, in which the power is transmitted both to the separating unit A and the original transporting rubber roller 205 constituting the original transporting member of the original image reading unit B. The peripheral speed of the separating roller 4 is substantially equal to that of the original transporting rubber roller 205.

The rotation of said rubber roller 205 causes the original document, the front end of which has reached the nip 0 between said rubber roller 205 and the contact sensor 206, to be pinched between the rubber roller 205 and the contact sensor 206, and said original document is transported by the rotating force of the rubber roller 205, in sliding contact with the reading face of the contact sensor 206, thus continuously passing over said reading face 206a.

The image bearing face of the original document is downward, thus facing the reading face 206a of the sensor, so that the image information on the transported original document is converted into time-sequential image signals from the front end to the rear end, by means of the sub-scanning movement of the original document by the rubber roller 205 and the reading function of the sensor 206 in the main scanning direction, perpendicular to the direction of said sub-scanning movement. Said time-sequential pixel signals are transmitted through a wire or by a wireless method to a facsimile apparatus of destination if a facsimile apparatus is involved, or supplied to a laser beam scanning control circuit if a laser beam printer is involved.

Said period $t_1$ may be changed to a period $t_2$ including a certain surplus time $\alpha$. In this manner, even after the arrival of the front end of the original document at the nip 0 between the rubber roller 205 and the contact sensor 206, the rotation of said rubber roller 205 is not initiated until the lapse of said surplus time $\alpha$, so that a loop is formed in the original document present in the sheet path between the separating roller 204 and the rubber roller 205 due to the driving by the separating roller 204. Consequently the entire front end of the original document is received by the nip between the rubber roller 205 and the contact sensor 206. In this manner it is rendered possible to prevent or correct the skewed transportation of the original document, or the skewed reading of the image resulting therefrom.

The above-mentioned period $t_1$ or $t_2$ may be set in a timer circuit of the control circuit D, which is activated by the front end detection signal from the sensor 7. In this case the forward rotation X of the motor M is switched to the reverse rotation Y in response to a signal indicating the expiration of the time of said timer circuit.

(vii) When the rear end of the original document, which is transported by the rubber roller 205 and is subjected to image reading by the sensor 206, passes through the nip between the separating roller 204 and the separating rubber plate 203 and reaches the position of the original sensor 207, a detection signal is sent therefrom to the control circuit D.

In response to said rear end detection signal, the control circuit D estimates the time $t_3$ required by the rear end of the original document, continuously transported after said detection, to reach the nip between the rubber roller 205 constituting the original transporting member and the contact sensor 206 and to completely pass through said nip 0, from the length of the sheet path from the position of the original sensor 207 to said nip 0 and from the original transporting speed of the rubber roller 205. Said period $t_3$ may be set in a timer in the control circuit D. After the lapse of said period $t_3$ from the above-mentioned detection of the rear end, the reverse rotation Y of the motor M is again switched back to the forward rotation X. Thus the power transmitting system is shifted from the above-mentioned second mode to the first mode, and the rubber roller 205 is simultaneously stopped. When the rubber roller 205 is stopped, the rear end of the original document which has completed image reading has passed the nip 0 between the rubber roller 205 and the sensor 206, and said original document is subsequently discharged from the apparatus for example by means of unrepresented discharge rollers.

(viii) The above-explained steps (iv) to (vii) are repeated in succession to effect the transportation and image reading on succeeding original documents. Thus, following the transportation and image reading of the final original document or the singly inserted original document, and after the lapse of a predetermined timer period $t_4$ required for said original document to be discharged from the apparatus by the discharge rollers, counted from the time $t_3$ when rear end of said original document has passed the nip between the rubber roller 205 and the contact sensor 206, and if the original sensor at the entrance detects the absence of the original documents, the power supply to the motor M is turned off, and the apparatus enters a stand-by state until the next original document is inserted.

As explained above, the original transporting rubber roller 205, which is constantly maintained in contact with the contact sensor 206, is rotated only while the original document is present between said two parts 205 and 206 but is not driven when said original document is not present. The roller constituting the original transporting member 205 may be replaced by an endless belt rotated in contact with the sensor 206.

In summary, in order to maintain the original document, inserted between the contact sensor and the original transporting member, in contact with said contact sensor and to securely advance said original document with a predetermined speed, said original transporting member has a surface composed of rubber material having a high friction to paper or plastics generally constituting the sheet-shaped original document. Also the image reading face of the contact sensor is composed of material having a high transmittance to visible light and a high abrasion resistance, such as glass, in order to achieve highly efficient optical image reading, while avoiding damage caused by friction with the original document.

Thus, while an original document is present between the contact sensor and the original transporting member and is transported by said member, the load torque of the drive source for driving the original transporting member can be small, because the friction between the original document and the contact sensor is sufficiently smaller than that between the original document and the reading face of the contact sensor.

The friction between the original transporting member and the contact sensor is far larger than that between the original document and the reading face of the contact sensor, and also is larger than that between the original document and the original transporting member. Consequently the load torque on the drive source becomes far larger when said original document is absent.

As explained in the foregoing, the above-explained embodiment selects a state of driving the separating unit alone or a state of driving also the original transporting member, according to the rotating direction of the drive source. It is thus made possible to prevent the abrasion of the rubber surface of the original transporting member and the reading face of the contact image sensor, resulting from sliding contact thereof, and to reduce the load on the drive source, as the high load torque resulting from high friction between the two is avoided. Particularly the latter leads to cost reduction of the drive source, saving in electric power consumption and reduction in heat generation.

Also it is possible to correct the skewed advancement of the original document, by causing the front end of the original document to contact with the nip between the original transporting member and the contact linear image sensor, and thereby aligning the direction of the original document.

What is claimed is:

1. An original reading apparatus comprising:
   first transport means for transporting an original document;
   second transport means for transporting the original document, transported by said first transport means, to original reading means, said second transport means being composed of a rotary member adapted for transporting the original document by rotation in contact with a glass member of the reading means;
   original detecting means positioned between said first and second transport means; and
   drive means for starting the rotation of said second transport means after the lapse of a predetermined period from the detection of the front end of the original document by said original detecting means, required for said front end to reach the position of said contact.

2. An original reading apparatus according to claim 1, wherein rotation of said first transport means and that of said second transport means are controlled by separate drive sources.

3. An original reading apparatus according to claim 1, wherein rotation of said first transport means and that of said second transport means are controlled by a common drive source.

4. An original reading apparatus comprising:
   first transport means for transporting an original document;
   second transport means for transporting the original document, transported by said first transport means, to original reading means;
   drive means for commonly driving said first and second transport means;
   power switch means for transmitting or disconnecting the power from said drive means to or from said first or second transport means, said power switch being adapted to transmit the rotation of said drive means in a direction to the first transport means, and the rotation in the other direction to the second transport means; and
   original detecting means, positioned between said first and second transport means and adapted to reverse said drive means after the lapse of a predetermined period from the detection of the original document by said original detecting means.

5. An original reading apparatus according to claim 4, wherein said second transport means is composed of a rotary member adapted for transporting the original document by rotation in contact with a glass member of the reading means.

6. An original reading apparatus comprising:
   first transport means for transporting an original document;
   second transport means for transporting the original document, transported by said first transport means, toward original reading means; and
   drive switch means for reverse rotating said second transport means when said first transport means is rotated in forward direction, and thereafter rotating said second transport means in forward direction.

7. An original reading apparatus according to claim 6, further comprising drive means for commonly rotating said first and second transport means.

8. An original reading apparatus according to claim 7, further comprising original detecting means positioned between said first and second transport means, wherein the first transport means is stopped and the second transport means is rotated in forward direction after the lapse of a predetermined period from the detection of the original document by said original detecting means.

9. An original reading apparatus comprising:
   first transport means for transporting an original document;
   second transport means for transporting the original document, transported by said first transport means, to original reading means; and
   drive switch means for rotating said second transport means in forward direction when said first transport means is rotated in forward direction, and thereafter rotating said second transport means alone in forward direction.

10. An original reading apparatus according to claim 9, further comprising drive means for commonly rotating said first and second transport means.

11. An original reading apparatus according to claim 10, further comprising original detecting means positioned between said first and second transport means, wherein the power transmission to the first transport means is stopped and the second transport means is rotated in forward direction after the lapse of a predetermined period from the detection of the original document by said original detecting means.

12. An original reading apparatus according to claim 11, wherein forward or reverse rotation of the first and second transport means is controlled by forward or reverse rotation of drive means.

13. An original reading apparatus comprising:
   first transport means for transporting plural stacked original documents to a downstream side;
   second transport means for transporting the original documents for effecting image reading;
   image reading means;
   detecting means positioned downstream of said first transport means for detecting an end of the original document;
   drive switch means functioning in such a manner as to drive said first and second transport means in a direction to transport the original document at the rotation of a single drive source in a direction and to drive said second transport means in said transport direction of the original document but to deactivate said first transport means at the rotation of said single drive source in the other direction; and
   control means for stopping and reversing said drive source at predetermined intervals in response to signals obtained in said detecting means, when the original document transported by said first transport means reaches said detecting means, second transporting means and reading means, thereby causing said second transport means and said reading means to effect the transportation and reading of the original document.

14. An original reading apparatus in which the image of a sheet-shaped original document is read by transporting said original document by first transport means, introducing said original document between reading means and second transport means maintained in mutual contact under a predetermined pressure, and is transported in sliding contact with an image reading face of said reading means by the transporting force of said transporting means rotated at a predetermined peripheral speed:
   wherein said first and second transport means have a common drive source;
   wherein the power of said drive source is transmitted to the first transport means and second original transport means through a power transmitting system switchable, according to the direction of rotation of said drive source, between a first transmission mode in which the power is transmitted to the first transport means only, and a second transmission mode in which the power is transmitted both to the first and second transport means;
   wherein an original sensor is provided for detecting the passing of the original document, transported by said first transport means, through a predetermined position; and
   wherein said power transmission system is switched to said first transmission mode thereby preventing said second transport means from rotation in a period in which the original document is identified by a control circuit, according to the detection information from said original sensor, as not present between said reading means and said second transport means.

15. An original reading apparatus in which the image of a sheet-shaped original document is read by separating and transporting an original document by a separating unit, introducing said original document between a contact image sensor and an original transporting member maintained in mutual contact under a predetermined pressure, and is transported in sliding contact with an image reading face of said image sensor by the transporting force of said original transporting member rotated at a predetermined peripheral speed:
   wherein said original transporting member and said separating unit have a common drive source;
   wherein the power of said drive source is transmitted to said separating unit and said original transporting member through a power transmitting system switchable, according to the direction of rotation of said drive source, between a first transmission mode in which the power is transmitted to said separating unit only, and a second transmission mode in which the power is transmitted both to the separating unit and the original transporting member;
   wherein an original sensor is provided for detecting the passing, through a predetermined position, of the front and rear ends of the original document separated and transported by said separating unit; and
   wherein said power transmission system is switched to said first transmission mode thereby preventing said original transporting member from rotation in a period in which the original document is identified by a control circuit, according to the information of detection of front and rear ends by said original sensor, as not present between said contact image sensor and said original transporting member.

* * * * *

UNITED STATES PATENT AND TRADEMARK OFFICE
CERTIFICATE OF CORRECTION

PATENT NO. : 4,953,037
DATED : August 28, 1990
INVENTOR(S) : Yoshio Ito, et al.

It is certified that error appears in the above-identified patent and that said Letters Patent is hereby corrected as shown below:

COLUMN 6:

Line 62, "one-directional, clutch 27," should read --one-directional clutch 27,--.

COLUMN 8:

Line 52, "204a:" should read --204a,--.

Signed and Sealed this

Twenty-first Day of April, 1992

Attest:

HARRY F. MANBECK, JR.

*Attesting Officer*      *Commissioner of Patents and Trademarks*